United States Patent [19]

McCormick et al.

[11] Patent Number: 4,769,136
[45] Date of Patent: Sep. 6, 1988

[54] FILTER UNIT WITH LINKED VALVE ACTUATORS

[75] Inventors: Ricky H. McCormick, Portage; John D. Vander Ark, Jr., Kalamazoo, both of Mich.

[73] Assignee: Delaware Capital Formation, Inc., Wilmington, Del.

[21] Appl. No.: 35,960

[22] Filed: Apr. 8, 1987

[51] Int. Cl.⁴ .......................................... B01D 29/38
[52] U.S. Cl. ............................. 210/108; 210/333.01; 210/427; 251/58; 251/229; 74/606 R
[58] Field of Search .................. 210/141, 142, 333.01, 210/333.1, 411, 108, 422, 423, 425, 426, 427; 251/58, 229; 74/60, 606 R, 607

[56] References Cited

U.S. PATENT DOCUMENTS

| | | | |
|---|---|---|---|
| 3,533,595 | 10/1970 | Gzeski | 251/58 |
| 3,692,178 | 6/1970 | Reece | 210/333.1 |
| 3,929,024 | 12/1975 | Sheesley et al. | 251/58 |
| 3,976,577 | 8/1976 | Kaiser | 210/333.01 |
| 3,980,560 | 9/1976 | Eades | 210/141 |
| 4,172,367 | 10/1979 | McCusker | 74/606 R |
| 4,594,166 | 6/1986 | Clinton et al. | 210/141 |

OTHER PUBLICATIONS

Ronningen-Petter Liquid Filters Catalog (1984) Bulletin RP-1.

*Primary Examiner*—Richard V. Fisher
*Assistant Examiner*—Richard D. Jordan
*Attorney, Agent, or Firm*—Flynn, Thiel, Boutell & Tanis

[57] ABSTRACT

A filter assembly includes at least one filter unit, a plurality of conduits extending transversely past the filter unit, a plurality of valves actuable to connect the filter unit to the conduits for alternate forward and reverse fluid flow through the filter unit, a plurality of actuators designed to actuate said valves on a one to one basis and a single drive motor linked to all the actuators of a given filter unit. The number of valves and actuators per filter unit correspond to the number of conduits to which the filter unit is to be attached.

17 Claims, 4 Drawing Sheets

FIG. 7

FILTER UNIT WITH LINKED VALVE ACTUATORS

FIELD OF THE INVENTION

This invention relates to a filter assembly having at least one filter unit, a plurality of conduits extending transversely past the filter unit and a plurality of valves actuable to connect the filter unit to the conduits for alternate forward and reverse fluid flow through the filter unit.

BACKGROUND OF THE INVENTION

U.S. Pat. No. 3 976 577, assigned to the assignee of the present invention, shows a prior high pressure liquid filter system for industrial use in which plural side-by-side filter units are spaced along an array of vertically spaced horizontal conduits, for example backwash, filtered liquid outlet, process liquid inlet, and drain (blow off) conduits in descending order. A set of four valves, namely respective backwash, filtered liquid outlet, process liquid inlet, and drain valves, connect the respective backwash, filter liquid outlet, process liquid inlet and drain conduits to a filter unit or pair of filter units. Each of the four valves is equipped with its own individually controlled pneumatic actuator. The backwash and filtered liquid outlet valves are mechanically linked and connected to the top of the filter unit and the process liquid inlet and drain valves are mechanically linked and connected to the bottom of the filter unit. A given mechanical link assures that both of its valves are not simultaneously in the full open position and such links are mere synchronizers, actuation of the valves being by the individual pneumatic actuators. A link interconnects the pneumatic actuators for the process liquid inlet valve and drain valve and a second link interconnects the pneumatic actuators for the filter liquid outlet valve and backwash liquid inlet valve. The connections of such links to such pneumatic actuators are exposed.

In normal operation, process liquid from the process liquid inlet conduit passes up through all of the filter units simultaneously and thence appears as filtered liquid in the filtered liquid outlet. Eventually back pressure in the filter units rises due to build up on the filter of solids filtered from the process liquid. This is cured by shifting the valves connecting one or a pair of the filter units to terminate process liquid flow (filtering flow) therethrough and instead permit backwash liquid flow from the backwash conduit through the filter unit to the drain conduit while the rest of the filter units continue filtering flow. In this way the filtering operation of the system as a whole is continuous and yet the filter units are backwashed one or a pair at a time.

Filter systems of this kind are usable for filtering of various process liquids including hot and/or abrasive process liquids. For example, systems of this kind are usable in chemical plants, pulp mills, refineries etc.

In one particular example, process liquid temperatures in the range of 400°–550° F. are frequently encountered in refinery installations. To avoid loss of process liquid heat and to reduce the need to reheat process liquid, it is known to locate a heat retaining (insulative) box around the major portion of the filter system, the four pneumatic actuators per filter unit, or filter unit pair, being outside the heat retaining box to avoid heat damage to their internal seals.

In the prior patent, each of the actuators was controlled by a solenoid valve, the solenoid valves being located outside the heat retaining box along a bottom frame member of the apparatus.

The system disclosed in above mentioned U.S. Pat. No. 3,976,577 has proven satisfactory in service, but a continuing effort to improve systems of this general kind has resulted in the present invention.

The objects of the present invention include provision of:

(1) a filter assembly in which there is a substantial reduction in the number of pneumatic actuators as well as a change in the type of pneumatic actuator, in which there is only one actuator per filter unit (or filter unit pair) rather than one per valve, and wherein all four valves (backwash, filtered liquid output, process liquid input and drain valves) are positively mechanically interlinked for both (1) positive mechanical actuation of each and (2) simultaneous synchronization of opening and closing of all four valves, wherein the number of valve actuating parts susceptible to wear or damage is reduced by a factor of four wherein the likelihood of down time due to failed actuators is correspondingly reduced, and wherein the number of pressurizable air lines leading to actuators is correspondingly reduced so as to reduce clutter and complexity and cost in the air circuitry;

(2) an assembly as aforesaid, in which the valve actuator levers and their pivot connections to links are protected in which the drive motor is supported on actuator housings fixed to ones of the valves and not on the filter units, conduits or frame supporting the latter, wherein the motor and actuator housings are installable as a unit and are substitutable on existing field installations for actuators of earlier type, and wherein tolerance and alignment problems that may result from variations in location of the filter units, valves, conduits and frame members with respect to each other are minimized;

(3) an assembly as aforesaid, in which the number of pneumatic lines susceptible to damage is substantially reduced, and in which pilot valves previously located on the lower portion of the frame are now located to be less susceptible to damage;

(4) an assembly as aforesaid, wherein pivotable valve actuating levers are enclosed to more readily avoid contact with persons or objects moving therepast;

(5) an assembly as aforesaid, in which any tendency for the motor driven actuator to twist its housing, upon actuation by said motor, is minimized;

(6) an assembly as aforesaid, which is usable with liquids containing abrasive particles in which a tendency for abrasive particles to collect on and prematurely wear the drain valve seat is minimized.

(7) an assembly as aforesaid, which is usable with hot liquids wherein a temperature drop across the drain valve is minimized, so as to minimize temperature differential induced dimensional changes and distortions and thereby avoid valve malfunction or failure resulting therefrom; and (8) an assembly as aforesaid, in which the major portions of the apparatus are enclosable in a heat insulating box with the drive motor and a control therefore located outside the box so as to be free of elevated temperatures within the box, the insulated box helping to reduce heat loss from preheated process liquid.

Other objects and purposes of the invention will be apparent to persons acquainted with apparatus of this type upon reading the following specification and inspecting the accompanying drawings.

SUMMARY OF THE INVENTION

The objects and purposes of this invention are met by providing a filter assembly including at least one filter unit, a plurality of conduits extending transversely past the filter unit, a plurality of valves actuable to connect the filter unit to the conduits for alternate forward and reverse fluid flow through the filter unit, a plurality of actuators designed to actuate said valves on a one to one basis, a single drive motor linked to all the actuators of a given filter unit, the number of valves and actuators per filter unit corresponding to the number of conduits to which the filter unit is to be attached.

DETAILED DESCRIPTION

A filter assembly A (FIG. 1 and 2) embodying the invention comprises a supporting frame structure 1 including a plurality of uprights 2 interconnected by longitudinal members 3 along the front side thereof and transverse brace members 5 and angled brace members 6. Extending longitudinally and centrally through the frame 1, between front and rear uprights 2 thereof, are, in vertically spaced relation, a process liquid inlet conduit 7, a filtered liquid outlet conduit 9, a backwash inlet conduit 12 and a drain (blow off) conduit 13. Typically the backwash conduit 12 is topmost, the filter liquid outlet unit 9 is spaced therebelow and the drain and process liquid inlet conduits are in turn spaced below the outlet conduit. However, locations may change due each installation's requirements. The relationship of the drain conduit and process liquid inlet conduit departs from the above discussed prior art, as discussed hereafter.

Figure 1:
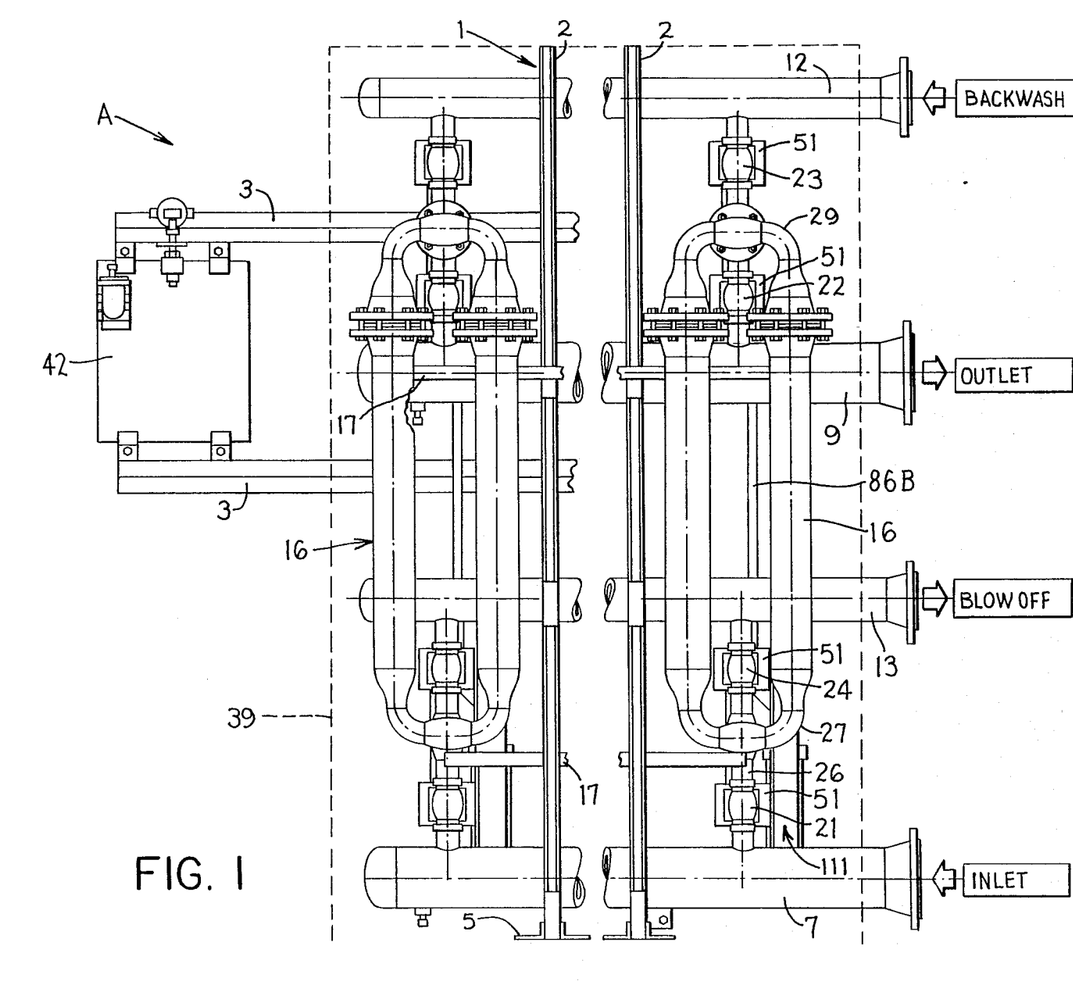
FIG. 1 is a fragmentary rear view of a filter assembly embodying the invention.
Figure 2:
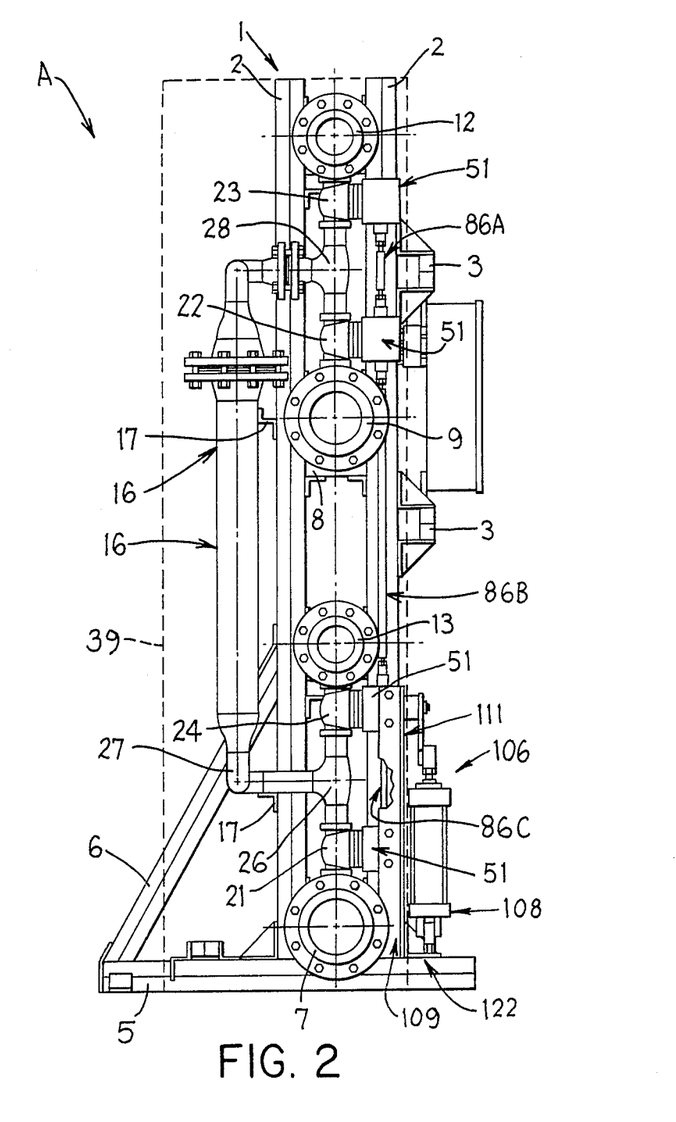
FIG. 2 is a right end view of the FIG. 1 apparatus.

FIG. 1 shows the rightward ends of the conduits 7, 9, 12 and 13 suitably equipped (here flanged) for connection to a process liquid source, a point of use for filtered process liquid, a backwash liquid source, and a drain. The conduits 7, 9, 12 and 13 are fixedly supported on the frame uprights 2 by suitable cross members 8 (FIG. 2). A plurality of upstanding filter units 16 are fixedly supported by further longitudinal members 17 on the rear side of rear frame uprights 2. The filter units may be arranged alone or (as here shown) in pairs. The filter units 16 are spaced in side-by-side relation along the conduits 7, 9, 12 and 13.

For each filter unit 16, or in the embodiment shown each filter unit pair, there is provided an on/off valve connected to each of the conduits 7, 9, 12 and 13, and thus in the embodiment shown a total of four valves, namely a process liquid inlet valve 21, a filter liquid outlet valve 22, a backwash liquid inlet valve 23 and a drain valve 24. The valves 21-24 of each set are vertically aligned and coplanar with the vertically spaced array of conduits 7, 9, 12 and 13. The valves 21 and 24 are vertically disposed between and respectfully adjacent to the inlet and drain conduits 7 and 13. The valves 22 and 23 are disposed vertically between and adjacent to the respective conduits 9 and 12. Valves 21 and 24 connect from their respective conduits 7 and 13 through respective arms of a tee 26 and the leg of the tee to a fitting 27 connected to the bottom of the filter unit 16. Similarly, the valves 22 and 23 connect their respective conduits 9 and 12 through respective arms of a further tee 28 and through the leg thereof to a fitting 29 connected to the top of the corresponding unit 16. In the embodiments shown, where each set of four valves serves a pair of filter units 16, the fittings 27 and 29 are connected respectively to the bottom and top of both filter units 16 of the pair. The fittings 27 and 29 are thus in effect tees with arms curved in a U-shape.

Figure 3:
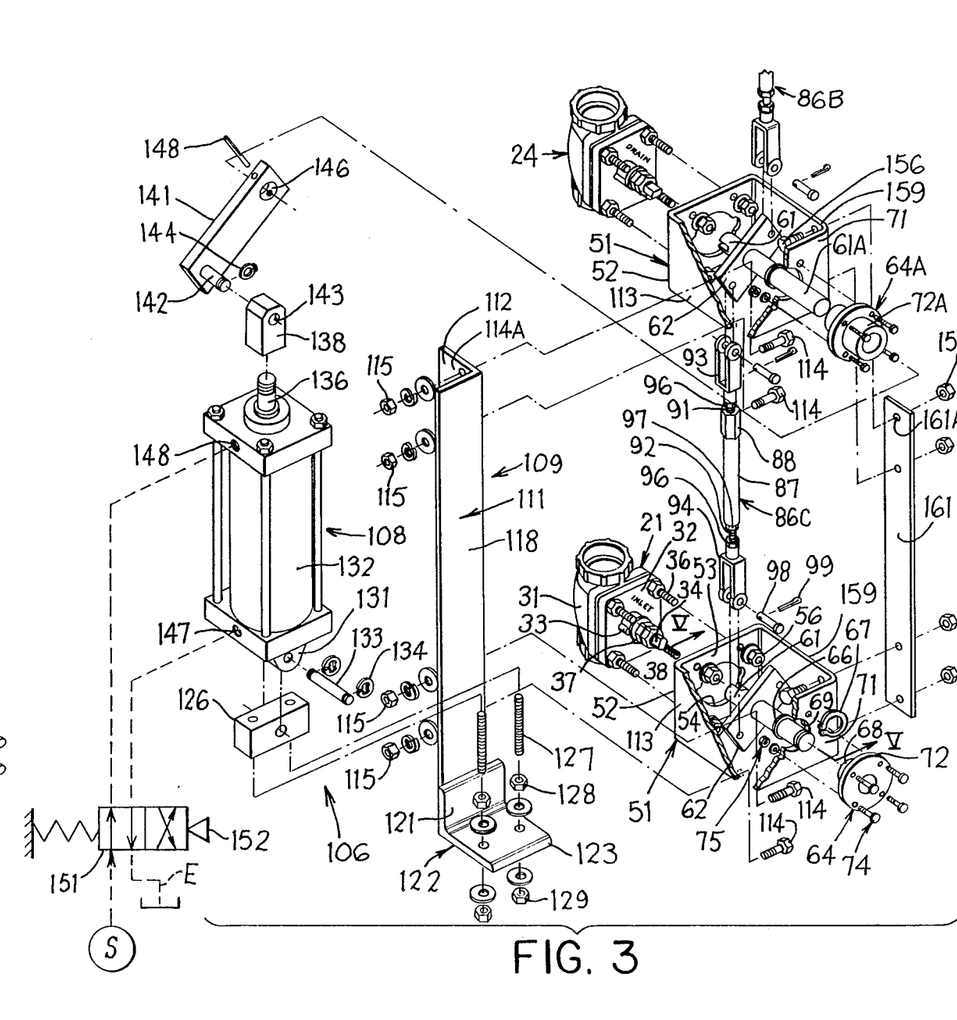
FIG. 3 is an exploded pictorial view of the drive motor, drain and inlet valves, associated links, and a bracket for mounting the drive motor with respect to the actuator housings.

Referring to FIG. 3, each of the valves 21-24 have a housing 31 from the front face 32 of which protrudes a central boss 33 from which forwardly protrudes a shaft 34 rotatably actuable to shift the valve from an open to closed position and vice versa. The shaft 34 carries packing 37 held in place by packing nuts 38. In the embodiment shown, the valves 21-24 are conventional ball valves. Threaded mounting studs 36 protrude forwardly from the front face 32 of the valve.

A control box 42 is mounted on the upper longitudinal members 3 in laterally offset relation from the array of filter units 16, shown at FIG. 1. When filtration of high temperature liquids is intended, it is an option to surround the filter units 16, their valves 21-24 and the associated portions of the conduits 7, 9, 12 and 15 in an insulative envelope or box indicated by the dotted lines at 39 in FIGS. 1 and 2.

To the extent above described, the apparatus is conventional and corresponds to that shown in above-mentioned U.S. Pat. No. 3,976,577.

Figure 4:
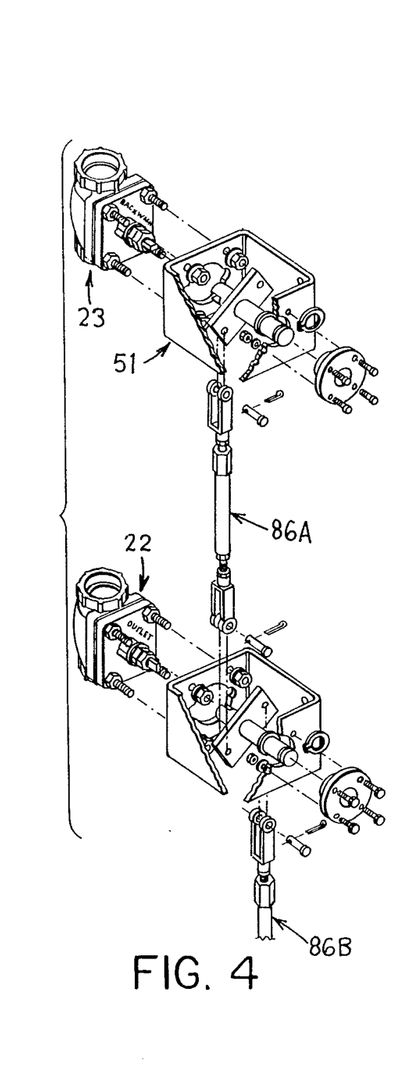
FIG. 4 is an exploded view, similar to that of FIG. 3, but showing the backwash and outlet valves, associated actuators and corresponding links.

Turning now to structure more directly involved in the present invention, attention is directed to FIGS. 3 and 4. An actuator 51 is fixedly supported by and operates each of the valves 21-24. Each actuator 51 comprises a housing 52 in the form of an open topped rectangular box. A hole 54 in the rear wall 53 of each box 52 receives the boss 33 of the corresponding valve housing 31 therein. The hole 54 is big enough to accommodate the central boss 33, as well as packing 37 and packing nuts 38 with adequate clearance. The studs 36 on the valve housing 31 penetrate through holes in the rear wall 53 of the box 52 and nuts 56 thread on the studs 36 to fix the rear wall 53 of box 52 to the front of valve housing 31.

An actuator shaft 61 fixedly carries a double ended, diametrically extending lever 62 at approximately the midportion of the actuator shaft 61. The forward end (rightward end in FIG. 3 and remote from the corresponding valve housing 31) is rotatably supported in a radial and axial thrust bearing unit 64. The rightward end of the shaft 61 is circumferentially grooved to receive a pair of external split rings 66 and 67 which abut the left and right ends of the bearing unit 64 to axially position the shaft 61 with respect to the bearing unit 64 in a snug, axial thrust receiving manner. The rear end 68 of the bearing unit 64 is received rearwardly through a hole 69 in the front wall 71 of the box 52. The front end 72 of the bearing unit 64 defines a radially outward extending flange held in overlapping relation against the front face of the front wall 71 of box 52 by screws 74 and nuts 75 to axially locate the actuator shaft 61 within the box 52.

The rear end of the actuator shaft 61 is radially and circumferentially fixed with respect to the front end of the valve shaft 34. A rectangularly shaped diametral slot 78 extends diametrally through the rear end of the actuator shaft 61 and is axially sufficiently deep to permit the flatted front end of valve shaft 34 to extend forwardly so that the diametrally opposed flats 34A on opposite sides of the valve shaft 34 snugly but axially slidably engage the diametrically opposed sides of the slot 78. The radial width of the slot 78 slightly (by a clearance dimension) exceeds the diametral width across the flats 34A of valve shaft 34. Accordingly, rotation of the actuator shaft 61 correspondingly rotates the valve shaft 34.

Figure 6:
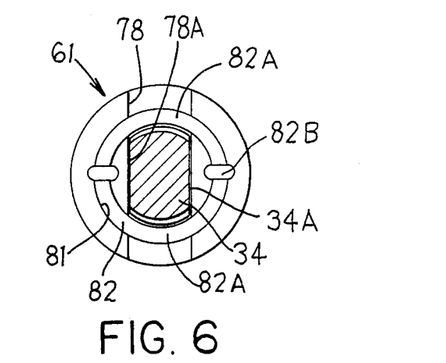
FIG. 6 is a sectional view taken substantially along the line VI—VI of FIG. 5.
Figure 7:
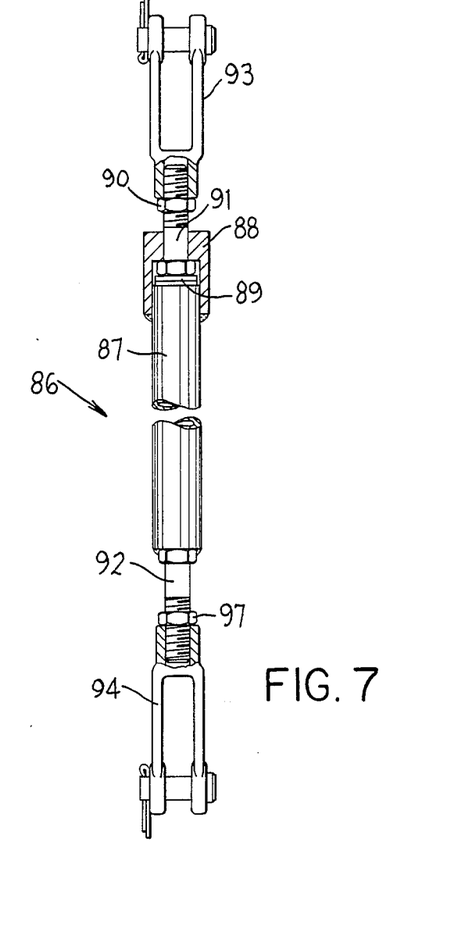
FIG. 7 is a partially broken, fragmentary elevational view of a link useable in FIG. 3.

The rear end of the valve shaft 61 is also radially piloted on the valve shaft 34 to prevent significant radial bending of the actuator shaft 61 upon application of a torque to the lever 62 thereon. In the embodiment shown, such piloting is accomplished by providing an annular, rear facing groove 81 coaxially in the rear end face of the actuator shaft 61 into which groove is received a ring 82 fixed to the actuator shaft 61, as by welding indicated at 82B in FIG. 6. The valve shaft 34 is axially insertable forwardly through the ring 82. Circumferential portions 82A of the ring 82 extend circumferentially across the diametral slot 78 and cooperate with the opposed central walls 78A of the diametral slot 78 to radially pilot the rear end of the actuator shaft 61 on the front end of the valve shaft 34. In this way, both ends of the actuator shaft 61 are radially supported, the lever 62 being located between such front and rear radial supports. Since the front and rear radial supports are relatively close together the actuator shaft 61 tends to strongly resist radial deflection in response to torque applied to the lever 62.

The other actuators 51 are preferably similar to the one above described, with exception of one such actuator 51 which has a forwardly extended actuator shaft as hereafter discussed. The actuators 51 are preferably vertically aligned (as well as vertically spaced in correspondence to the vertical spacing of the valves 21–24).

The levers 62 of the actuators 51 are mechanically connected by links 86. The links 86 are length adjustable. In the preferred embodiment shown, each link 86 comprises an elongate body 87. A stepped cap 88 is fixed, by welding, to the top of the body 87 and defines an undercut recess in which is trapped the enlarged head of a screw 91. The body 87 and cap 88 are freely retightable coaxially with respect to the screw 91. Spacers, such as washers, 89 trapped between the upper end of the body 87 and the head of the screw 91 act as thrust bearings to facilitate rotation of the body 87 and cap 88 with respect to the screw 91. The bight of a shackle, or clevis, 93 is threaded on the threaded upper end of the screw 91 and locked in place thereon by a lock nut 90 such that the shackle 93 is fixed to the screw 91. A further screw 92 depends coaxially from the lower end of the body 87 and has its head fixed, as by welding, to the bottom end of the body 87. The threaded lower end of the screw 92 is threaded into the bight of a further shackle or clevis 94 with depends therefrom. A further lock nut 97 is loosenable to permit rotation of the body 87 and screw 92 with respect to the lower shackle 94 to axially lengthen or shorten the link 86. The lock nut 97 is, alternately, tightenable against the bight of the shackle 94 to prevent rotation of the body 87 with respect to the shackle 94 and thus prevent lengthwise adjustment of the link 86. Thus, adjustment of the length of the link 86 is easily accomplished merely by loosening of one lock nut, rotation of the body 87 and retightening of the same lock nut. This is simpler and quicker than would be possible using a conventional turnbuckle as the link since adjustment of a conventional turnbuckle would require manipulation of two lock nuts rather than one. The bodies 87 of the several links 86 differ in length depending on the separation of the actuators 51 which they are to join. Of the three links 86A, 86B and 86C identified in FIG. 2, the top and bottom ones 86A and 86C are relatively short and actuate relatively closely spaced valves 22 and 23 and relatively close spaced valves 21 and 24, respectively. On the other hand, the middle link 86B which actuates the widely spaced valves 22 and 24 (and hence the upper and lower valve groups) is of greater body length. The legs of each shackle 93, 94 receive therebetween an end of the corresponding double ended lever 62 and are pivotally secured thereto by a pin 98 secured with a cotter key 99. The above description applies to all of the actuators 51 and all of the links 86.

A drive assembly 106 (FIG. 3) comprises a drive motor 108 fixedly supported by a bracket 109 on an adjacent pair of the actuator housings 52, preferably those associated with the drain and inlet valves 24 and 21, namely the two bottom most valves of the valve array.

However, in some installations, it may be desired to support the drive motor adjacent another pair of valves, for example an upper pair of valves. The bracket 109 comprises an upstanding angle member 111 having a side flange 112 fixed adjacent its top and bottom ends to the left side wall 113 of the actuator housings 52 associated with drain and inlet valves 24 and 21 by screws 114 and nuts 115. The front flange 118 of angle member 111 has fixed, as by welding, adjacent its lower end the upstanding flange 121 of a foot-like angle member, or foot member, 122. The bottom flange 123 of the angle member 122 protrudes forwardly from the bottom of the upper flange 121 and supports atop thereof a laterally extending pivot block 126. Threaded studs 127 vertically thread through the pivot block 126 and extend through holes in the bottom flange 123 of foot member 122 and are fixed to the bottom flange 123 by flanking top and bottom nuts 128 and 129 which sandwich the bottom flange 123 therebetween. Thus, in the embodiment shown, the pivot block 126 sits atop the nuts 128 and is fixed rigidly thereatop by threaded connection with the top ends of the threaded studs 127.

The drive motor 108 here comprises a double acting pneumatic cylinder. A yoke 131 depending from the bottom of the cylinder housing 132 straddles the pivot block 126 and is pivotally attached thereto by a rod 133 extending therethrough and trapped therein by split rings 134 fixed to each end of the rod 133 and flanking the yoke 131. Thus, the rod 133 extends forwardly and the drive motor 108 is pivotable laterally with respect to the bracket 109. The upwardly projecting piston rod 136 of the cylinder 108 has fixedly threaded thereon a pivot block 138. A drive crank 141 has a pivot shaft 142 fixedly protruding forwardly from the lower, left end thereof and pivotally received in a bearing 143 in the pivot block 138. A split ring 144 holds the shaft 142 captive in the pivot block bearing 138. The actuator shaft 61 on one of the actuators 51, here the one associated with the drain valve 24, has a forward extension 61A and its bearing unit 64A has a forward extension 72A to provide a greater axial bearing length, to better absorb bending loads placed on the actuator shaft extension 61A. The front extension 61A protrudes forwardly beyond the bearing front end 72A to receive fixedly thereon the upper right end of the drive crank 141. For this purpose, the upper right end of the drive crank has a bore 146 for snugly receiving the shaft extension 61A. The drive crank 141 is fixed immovably to the shaft extension 61A for rotatably driving the shaft by a diametrally extending split pin 148.

The drive motor 108 has extend and retract ports 147 and 148 conventionally connected by air lines (indicated here in dotted lines) through a reversing valve 151 to a compressed air source S and an exhaust line E in a conventional manner. Preferably the core of reversing valve 151 is spring biased to its position shown for maintaining the pressure fluid cylinder in its retracted position shown, thereby maintaining the drive crank 141 and ball actuator levers 62 in their counter-clockwise position shown, which corresponds to the filtration flow (rather than backflow) position of the corresponding valves 21-24.

A conventional control means 152 is actuable to shift the reversing valve 151 from its position shown to reverse the connections to the ports 147 and 148 so as to extend upward the piston rod 136 and rotate the drive crank 141 clockwise through approximately a one quarter turn. This correspondingly actuates the directly connected lever 62 and actuator shaft 61, and through the links 86 correspondingly clockwise actuates the remaining levers 62 and shafts 61, so as to correspondingly clockwise rotate the four valve shafts 34 simultaneously. This shifts the corresponding filter unit 16 (or in the embodiment shown a pair of filter units 16) from normal filtration mode to backwash mode.

Fixing of the side flange 112 of the angle member 111 rigidly to the left sidewalls 113 of two adjacent boxes 52 prevents, in a rigid manner, the rotation of either box 52 in response to rotation of the actuator shaft 61A upon extension or retraction of the piston rod of cylinder 108. In the embodiment shown, a rigid vertical strap 161 extends vertically between, and is connected by machine screws 156 and nuts 158 to, the right side wall 159 of the adjacent pair of boxes 52 to which the angle member 111 is similarly secured. The strap 161 further rigidifies the connected pair of boxes 52 against relative movement upon extension or retraction of the piston rod 136 of the fluid cylinder 108.

Where an insulative box 39 is provided it is preferably arranged so that the front end 61A of the elongated one of the actuator shafts 61 protrudes outside of such insulative box 39 so as to be located outside thereof. Thus, the drive crank 141 and pressure fluid cylinder 108 are located outside such insulative box 39 and accordingly are shielded thereby from the presence of a high temperature liquid in the inlet conduit 7, filter unit 16 and connected apparatus.

The control 152 is a central control of conventional type which controls the valves 21-24 to normally hold same in filtration mode but occasionally backwashing one (or pair) of the filter units 16 by backwashing flow from the backwashing conduit 12 through the filter unit, or filter unit pair, 16 to the drain conduit 13 while continuing process liquid flow through the process liquid inlet 7 to the other filter units 16, such that the drain conduit 13 tends to be empty part of the time while hot process liquid flows in the process liquid inlet conduit 7.

By mounting the drain and inlet conduits 13 and 7 respectively above and below the bottom of the filter units 16, with the drain conduit being above the drain valve 24 and such drain valve being above the hot liquid inlet conduit 7, heated air rising from the hot liquid inlet conduit 7 tends to warm the drain conduit 13 and hence the upper side (as well as the lower side) of the drain valve 24. This tends to minimize the temperature differential between the bottom and top sides of the drain valve 24 during filtering of hot liquids despite the drain conduit being relatively cool.

Further, by locating the drain valve 24 above the inlet conduit 7, and indeed above the bottom of the filter unit 16, abrasive particles in the process liquid to be filtered entering the bottom fitting of the filter unit 16 are not deposited upon the drain valve seat, but rather tend to fall away therefrom.

It will be seen that the apparatus of FIGS. 3 and 4 (excluding the valves 21-24) is installable as a unit on the valves 21-24 of a filter unit (or filter unit pair) 16, either in a new system or in an existing prior system of the kind shown for example in above mentioned U.S. Pat. No. 3 976 577, assigned to the assignee of the present invention, as a replacement for the conventional valve actuators thereof.

To accomodate differences in the vertical spacing of the inlet and drain valves 21 and 24, for example in updating of filter systems in use, it is contemplated that angle members 111 and straps 161 of different effective length (screw hole spacing) may be employed. Alternately, the machine screw holes 114a in angle member 111 and 161A in strap 161 may take the form of vertically elongated slots to enable attachment of the angle member 111 and strap 161 to differently spaced adjacent boxes 52.

OPERATION

The operation of the inventive device will be clear from the foregoing description but will be described in part below for convenient reference.

Figure 5:
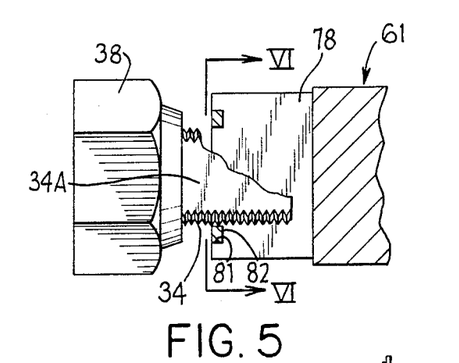
FIG. 5 is an enlarged, fragmentary, central cross-sectional view substantially taken along the line V—V of FIG. 3 showing the engagement of the actuator shaft with the valve shaft.

The apparatus of FIGS. 3 and 4 is preferably assembled as follows. Each actuator shaft 61 may be inserted into its respective box 52 by aiming the forward end of the shaft 61 downward and forward into the box and thus forwardly through the opening 69 in the front end of such box 52. The corresponding bearing 64 is then sleeved over the front end of the shaft 61 and the rear end of such bearing is inserted in the opening 69 in the front wall of the box 52. The bearing 64 is then secured to the box 52 by means of the screws 74 and nuts 75. The snap ring 67 is then placed on the front end of the shaft to hold it in the bearing. The actuator box 52 and captive actuator shaft 61 are then moved forward toward the corresponding valve housing 31, the rear end of the actuator shaft 61 being received over the front end of the valve shaft 34 in the manner discussed above with respect to FIGS. 5 and 6, and the nuts 56 are tightened on the corresponding threaded studs 36 protruding forward from the valve housing 31, thus fixing the actuator 51 to the front end of the corresponding valve housing 31. This is repeated for each of the valves 21-24 and their respective actuators 51. The links 86A-86C have the yokes (shackles) 93 and 94 of the ends thereof secured to corresponding ends of the levers 62 of the actuators 51 by means of the pins 98 and cotter keys 99. The effective lengths of the links are adjusted by rotation of the body 87 with respect to the yoke 94, whereafter the corresponding lock nut 97 is tightened to lock the length of the corresponding link. The link length is adjusted so that with the inlet and outlet valves 21 and 22 fully open, the backwash and drain valves 23 and 24 are fully closed, and vice versa.

Thereafter, the bracket 109 and strap 161 are fixed by the corresponding screws 114 and 156 (and corresponding nuts 115 and 158) to the opposite side walls 113 and 159 of two adjacent boxes 52, preferably the lowest ones, namely the ones associated with the drain and inlet valves 24 and 21. The crank 141 can then be secured by the pin 148 to the cantilevered front end 61A of the elongated actuator shaft associated here with the drain valve 24. The block 126 is mounted by means of the threaded studs 127 to the bottom flange 123 of foot member 122. The pressure fluid cylinder 108 is located on the foot 122 by straddling the block 126 with its depending yoke 131 and pivotally fixing same thereto by means of a rod 133 and split rings 134 so the pressure fluid cylinder 108 is free to pivot laterally through a limited arc. The block 138 is threaded atop the piston rod 136 of the pressure fluid cylinder and receives therethrough the shaft 142 of the drive crank 141, the two being secured pivotally together by the split ring 144. Conventional air lines (indicated in broken lines in FIG. 3) connect the extend and retract ports 147 and 148 of the cylinder 108 through the reversing valve 151, to which is connected an air pressure source S and an exhaust line E of conventional type. The position of the reversing valve 151 is controlled by conventional control 152.

In normal filtration operation, the inlet and outlet valves 21 and 22 of all of the filter units are full open for process liquid flow from the inlet conduit 7 through the inlet valve 21 into the bottom of the corresponding filter unit or filter units 16 thence upward through the outlet valve 22 to the outlet conduit 9. In normal filtration operation this flow occurs simultaneously in all filter units 16.

However, when a given filter unit 16 or filter unit pair requires backwashing, as determined by control 38 (for example on a timed basis or due to increased pressure drop across the filter unit), the control 38 selects a given filter unit (or filter unit pair in the embodiment shown) 16 and reverses the condition of the valves thereof, so that the valves 21 and 22 are fully closed and the backwash and drain valves 23 and 24 are fully open. This is done by having the control unit 38 act through the conventional control means 152 therein to shift the reversing valve 151 (FIG. 3) against its spring and out of its position shown, which reversing valve 151 is the one associated with the particular filter unit or filter unit pair to be backwashed. This causes the corresponding pressure fluid cylinder to extend its piston rod 136. This clockwise pivots the drive crank 141, shaft extension 61A and corresponding lever 62 fixed thereto. This in turn causes the corresponding links 86A-86C to shift all of the actuator levers 62 clockwise to accomplish the aforementioned shift of the valves 21-24 from their normal filtration mode to their backwash mode. Backwash flow is from conduit 12 through valve 23 and downward through the corresponding filter unit (or pair of filter units 16 as here shown) thence through the drain valve 24 and drain conduit 13 to clean the corresponding filter unit(s). After sufficient backwashing, for example after a sufficient time of backwashing, the control 152 and the box 38 allows spring return of the reversing one valve 151 to its normal position shown, the cylinder 108 retracts its piston rod and the drive crank 141 and levers 62 return counterclockwise to their normal, filtration positions shown. Typically, one filter unit (or here filter unit pair) 16 is backwashed at a time, the remaining filters continuing filtration flow. Hence, filtration flow through a majority of the filter units 16 continues unabated as individual filter units or filter unit pairs are backwashed in sequence.

Although a particular preferred embodiment of the invention has been disclosed in detail for illustrative purposes, it will be recognized that variations or modifications of the disclosed apparatus, including the arrangement of parts, lie within the scope of the present invention.

The embodiments of the invention in which an exclusive property or privilege is claimed are defined as follows:

1. A filter assembly, comprising:
   at least one filter unit;
   a plurality of conduits extending transversely past said filter unit;
   a plurality of valves actuable to connect said filter unit to said conduits for alternate forward and reverse fluid flow through said filter unit, each said valve having a housing and a shaft;
   plural actuators each comprising an actuator shaft and means for preventing bending stress on said actuator shaft during valve actuation, such means comprising a vertically open box fixed on a corresponding said valve housing, said actuator shaft being disposed within said box and being rotatably supported on the corresponding said valve shaft and on a bearing on the far wall of said box, thrust means preventing escape of said actuator shaft axially away from said valve, said actuator shaft being rotatably fixed with respect to said valve shaft, a lever diametrally fixed on said actuator shaft and disposed protectively within said box, and means fixedly mounting said boxes on corresponding ones of said valve housings, said levers being oriented substantially parallel to each other; and
   elongate vertical links, a said lever having a first end connected by one link to the first end of a lever therebelow and having a second end diametrally disposed across the corresponding shaft from said first end and connected by another link to the second end of another lever located thereabove.

2. The apparatus of claim 1 including a single double acting motor located side-by-side with one of said links connecting a pair of said actuator shafts, and means drivingly connecting said motor to an intermediate one of said actuator shafts for simultaneously pivotally moving said levers and shafts of the others of said actuators indirectly by means of said links interconnecting said levers, said one shaft being extended beyond the other shafts to engage said motor.

3. The apparatus of claim 1 including a rigid antitorque bracket fixed to corresponding sides of an adjacent pair of said actuator boxes for rigidly preventing pivoting of said boxes under torque loads imposed by said motor on said actuator shafts.

4. The apparatus of claim 3 including means mounting said motor on said bracket, said motor being drivingly connected to the actuator shaft supported by one of said adjacent pair of boxes to which said bracket is fixed, said corresponding sides of said adjacent boxes being substantially parallel to said actuator shafts thereof.

5. The apparatus of claim 3 including a frame, said conduits and filter unit being fixedly supported on said frame, said bracket being free of direct connection to said frame, such that said motor and bracket are supported only by connection to said boxes and hence to said valve housings.

6. The apparatus of claim 2 in which said longer actuator shaft has a free end portion extending beyond its box to protrude therefrom in a direction away from the corresponding valve, a drive crank fixed on said protruding free end portion of said shaft, said motor having a drive member connected to said drive crank for pivoting same and thereby pivoting the actuating levers of said other actuators.

7. The apparatus of claim 6 in which said motor comprises a pressure fluid cylinder pivoted at one end thereof on said bracket, said drive member being a piston rod extending from the other end of said pressure fluid cylinder and pivotally secured to said drive crank so that reciprocation of said piston rod pivots said levers and actuating shafts, to thereby switch said valves.

8. The apparatus of claim 1 in which said conduits comprise a substantially coplanar array of four substantially horizontal conduits in vertically spaced relation, said conduits more specifically comprising in vertically descending order (1) a backwash conduit, (2) a filtered liquid outlet conduit, (3) a drain conduit, and (4) a process liquid inlet conduit, the drain and inlet conduits being located at levels respectively above and below the bottom of said filter unit, said valves including a drain valve and an inlet valve interposed between and respectively connected at their remote sides to said drain conduit and inlet conduit and means connecting adjacent sides of said drain and inlet valves to the bottom of said filter unit, said conduits and filter unit being of a type capable of handling liquids which are hot compared to room temperature, the location of said drain valve and drain conduit above said inlet conduit tending to warm said drain conduit and hence the upper side of said drain valve due to heating of surrounding air by hot liquids in said inlet conduit and rise of such heated air upward past said drain conduit, and thereby tending to minimize the temperature difference between the bottom side and top side of said drain valve during filtering of hot liquids by said filter unit despite the drain conduit being relatively cool.

9. A filter assembly, comprising: at least one filter unit;

a plurality of conduits extending transversely past said filter unit;

a plurality of valves actuable to connect said filter unit to said conduits for alternate forward and reverse fluid flow through said filter unit, each said valve having a housing and a shaft shiftable for changing the state of the valve;

plural actuators each comprising an actuator housing fixed on a corresponding said valve housing and an actuator member for shifting the corresponding said valve shaft;

elongate links and means connecting each link between a corresponding pair of actuator members;

a single motor and means drivingly connecting said motor to only one of said actuator members for simultaneously shifting said actuator members of the others of said actuators indirectly by means of said links;

a rigid anti-torque bracket fixed to corresponding sides of an adjacent pair of said actuator housings for rigidly preventing pivoting of said pair of actuator housings under torque loads imposed by said motor on said actuator shafts;

means mounting said motor on said bracket, said motor being drivingly connected to the actuator shaft supported by one of said adjacent pair of actuator housings to which said bracket is fixed, said corresponding sides of said adjacent actuator housings being substantially parallel to said actuator shafts thereof; and a frame, said conduits and filter unit being fixedly supported on said frame, said bracket being free of direct connection to said frame, such that said motor and bracket are supported only by connection to said actuator housings.

10. The apparatus of claim 9 in which said actuator members each comprise a rotatable actuator shaft and a diametrically arranged lever fixed thereon, said link connecting means comprising pivot means connecting corresponding ends of adjacent levers to an intervening one of said links, said one actuator shaft being longer than the others and having a free end portion extending beyond its box to protrude therefrom in a direction away from the corresponding valve, a drive crank fixed on said protruding free end portion of said shaft, said motor having a drive member connected to said drive crank for pivoting same and thereby pivoting the levers of said other actuators.

11. The apparatus of claim 10 in which said motor comprises a pressure fluid cylinder pivoted at one end thereof on said bracket, said drive member being a piston rod extending from the other end of said pressure fluid cylinder and pivotally secured to said crank arm so that reciprocation of said piston rod pivots said levers and actuating shafts, to thereby switch said valves.

12. The apparatus of claim 9 in which said conduits comprise a substantially coplanar array of four substantially horizontal conduits in vertically spaced relation, said conduits more specifically comprising in vertically descending order (1) a backwash conduit, (2) a filtered liquid outlet conduit, (3) a drain conduit, and (4) a process liquid inlet conduit, the drain and inlet conduit being located at levels respectively above and below the bottom of said filter unit, said valves including a drain valve and an inlet valve interposed between and respectively connected at their remote sides to said drain conduit and inlet conduit and means connecting adjacent sides of said drain and inlet valves to the bottom of said filter unit, said conduits and filter unit being of a type capable of handling liquids which are hot compared to room temperature, the location of said drain valve and drain conduit above said inlet conduit tending to warm said drain conduit and hence the upper side of said drain valve due to heating of surrounding air by hot liquids in said inlet conduit and rise of such heated air upward past said drain conduit, and thereby tending to minimize the temperature difference between the bottom side and top side of said drain valve during filtering of hot liquids by said filter unit despite the drain conduit being empty.

13. A filter assembly for filtering hot process liquids, including abrasive hot process liquids, comprising:
  plural side-by-side filter units;
  a plurality of conduits extending transversely past said filter units, said conduits comprising a substantially coplanar array of four substantially horizontal conduits in vertically spaced relation, said conduits more specifically comprising a backwash conduit, a filtered liquid outlet conduit, a drain conduit and a hot process liquid inlet conduit, a plurality of valves actuable to connect said filter units to said conduits for alternate forward and reverse flow through a said filter unit, said valves including a drain valve and an inlet valve interposed between and respectively connecting at their remote sides to said drain conduit and inlet conduit, and means connecting the adjacent sides of said drain and inlet valves to the bottom of said filter unit;
  central means controlling said valves for occasionally backwashing one of said filter units by backwashing flow from said backwash conduit therethrough to said drain conduit while continuing process liquid flow through said process liquid inlet to the other filter units, such that said drain conduit tends to be empty part of the time while hot process liquid flows in said process liquid inlet conduit;
  means for minimizing the temperature differential across said drain valve and for minimizing collection of abrasive particles thereon from abrasive process liquid, said means comprising means mounting the drain and inlet conduits at levels respectively above and below the bottom of said filter unit, the drain conduit being above said drain valve and the drain valve being above said hot liquid inlet conduit, such that heated air rising from said hot liquid inlet conduit tends to warm said drain conduit and hence the upper side of said drain valve, and thereby tends to minimize the temperature differential between the bottom side and top side of said drain valve during filtering of hot liquids by said filter unit despite the drain conduit being empty.

14. The apparatus of claim 13 in which each of said valves has a housing and a shaft shiftable for changing the state of said valve, plural actuators each comprising an actuator housing fixed on a corresponding said valve housing and an actuator member for shifting the corresponding said valve shaft, elongate links and means connecting each link between a corresponding pair of actuator members, a single motor and means drivingly connecting said motor to only one of said actuator members for simultaneously shifting said actuator members of the others of said actuators indirectly by means of said links;
  container means having insulated walls and containing therein said conduits, filter units, valves, actuators and links for conserving process liquid heat during filtration, said motor being disposed outside said insulative walls of said container means, said one actuator member comprising a shaft protruding through one of said insulative walls and drivingly connected to said motor the valves connecting a given said filter unit to said backwash conduit, filtered liquid outlet conduit, drain conduit and hot processed liquid inlet conduit thus requiring for their shifting only a single shaft protruding through the insulative walls of said container means, so as to minimize heat loss from within said container means occasion by location of said motor outside, rather than inside, said container means.

15. The apparatus of claim 13 in which said valves include a backwash inlet valve and a filtered liquid outlet valve, a single backwash inlet valve, process liquid outlet valve, drain valve and inlet valve serving a pair of side-by-side filter units in parallel.

16. The apparatus of claim 13 in which said valves include a backwash inlet valve and a process liquid outlet valve, a single filter unit being served by a backwash liquid inlet valve, process liquid outlet valve, drain valve and process liquid inlet valve.

17. The apparatus of claim 9 in which said motor is a pressure fluid cylinder.

* * * * *